UNITED STATES PATENT OFFICE.

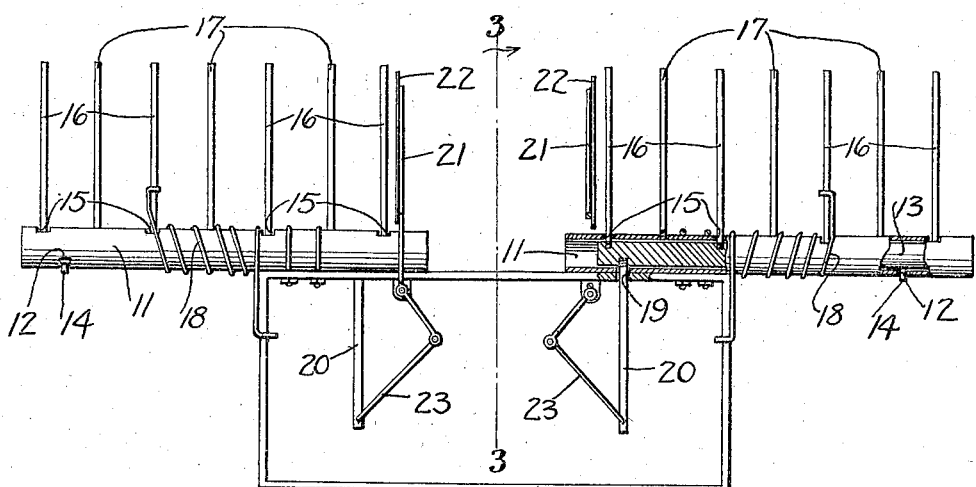
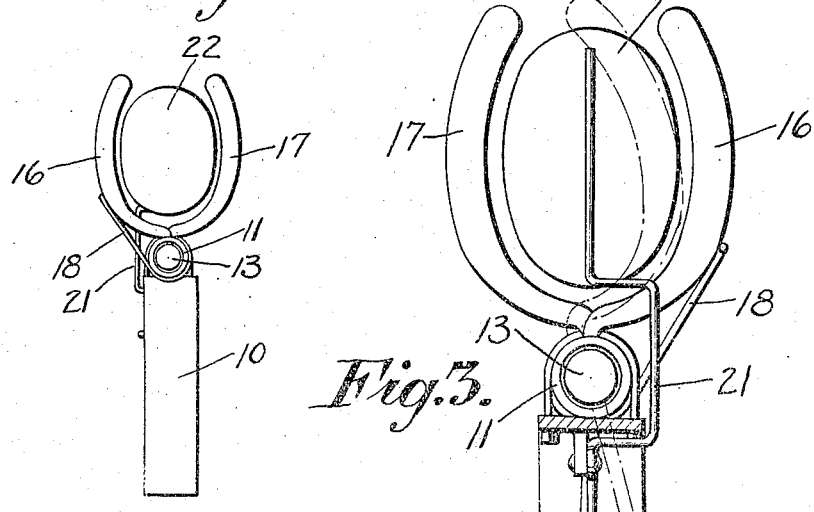
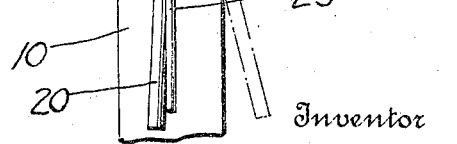

DOUGLAS E. BLACK, OF SUMNER, WASHINGTON.

MOLE-TRAP.

1,299,109.  Specification of Letters Patent.  Patented Apr. 1, 1919.

Application filed November 18, 1918. Serial No. 263,071.

*To all whom it may concern:*

Be it known that I, DOUGLAS E. BLACK, a citizen of the United States, residing at Sumner, in the county of Pierce, State of Washington, have invented certain new and useful Improvements in Mole-Traps; and I do hereby declare the following to be a full, clear, and exact description of the invention, such as will enable others skilled in the art to which it appertains to make and use the same.

This invention relates to new and useful improvements in animal traps and particularly to mole traps.

One object of the present invention is to provide a novel and improved form of trap of this character which is adapted to be placed in the mole run and which will effectively grip and hold the mole when tripped by it.

Another object of the invention is to provide a novel and improved trap of this character which is adapted to catch an animal in the run in the ground, when the animal is traveling in either direction.

Other objects and advantages will be apparent from the following description when taken in connection with the accompanying drawing.

In the drawing:

Figure 1 is a side elevation of a mole trap made in accordance with my invention.

Fig. 2 is an end view of the same, the trap being in set position.

Fig. 3 is a vertical transverse sectional view taken on the line 3—3 of Fig. 1.

Referring particularly to the accompanying drawing, 10 represents a rectangular frame which is adapted to be placed in a recess formed in the bottom of the mole run. Secured on the upper end of the frame, and extending in opposite directions and in longitudinal alinement, are the tubular shafts 11, in the lower portion of the inner end of each of which there are formed the slots 12 which extend a short distance circumferentially of the shafts. Rotatably disposed in the shafts 11 are the solid shafts 13, each having projections 14 which extend through the said slots and are arranged to engage with the end walls of said slots to limit the rocking movements of said shafts 13. Additional slots 15 are formed in the hollow shafts and through these slots project the arcuate jaws 16 which are rigidly carried and movable with the shafts 13. The shafts 11 also carry arcuate jaws 17, the number of members 17 being one less than the number on the shafts 13, whereby said jaws, when moved toward each other, in gripping position, will pass between those of the other shafts.

Coiled around each of the shafts 11 is a coil spring 18, one end being secured to the frame 10 and the other end being secured to one of the members 16 for the purpose of normally urging the shafts 13 to rock and move their arcuate members toward the members 17.

Carried by the inner end of each of the shafts 13, and extending through a slot 19, is a depending arm 20, said arm being disposed within the frame 10, as shown. It will be noted that the arcuate members are disposed in longitudinal alinement whereby a passageway between those of the shafts 11 and those of the shafts 13, is formed, and between these members, and through this passage, the mole passes, when traveling through the run.

Pivotally mounted on the frame, at the inner end of each of the shafts 11, is a vertical lever 21, on the upper end of which is secured a metal disk 22, said disk being arranged to close the inner end of the passageway between the jaws, so that the mole will be forced to press against said disk if it desires to proceed through the run. The portion of the lever below the pivot is extended at an obtuse angle therefrom and has a link 23 pivotally connected to its lower end.

To set the trap the depending arms 20 are moved to one side so that the shafts 13 will be rocked within the shafts 11, and against the tension of the springs 18. This will move the jaws of the shafts 13 away from the jaws of the shafts 11, as will be clearly seen in the drawing. The disks are then moved into upright or vertical positions and the links 23 engaged with the lower ends of the arms 20 to hold said arms against movement. When the mole presses against the disk the lever 21 will be rocked on its pivot with the result that the link 23 will be disengaged from the arm 20 and the spring 18 permitted to rock the shaft 13 to move its jaws over toward the jaws 17, with the result that the animal will be firmly gripped between said jaws.

By reason of the fact that the link 23 is pivotally connected to the lower end of the lever 21, when said lever is moved by the mole this pivot joint will move toward the arm 20 and the tendency will be for the said joint to open, with the result that the link will be moved downwardly beyond the lower end of the arm 20, and the arm thus released. The shaft 13 will then be free to rock, under the influence of the spring 18 and cause the jaws of both shafts to grip the body of the mole.

What is claimed is:

1. A mole trap including a supporting frame, a stationary shaft mounted on the frame, a rock shaft mounted in the first shaft, resilient means carried by the first shaft and connected at one end to the frame, coöperating gripping jaws carried by the shafts, the other end of the spring being connected to one of the jaws of the rock shaft, a depending arm carried by the rock shaft, a disk pivotally mounted on the frame adjacent the innermost of the jaws, and a detent carried by the disk and engageable with the said arm to hold the rock shaft and jaws thereof away from the first shaft and the jaws thereof.

2. A mole trap including a frame, a stationary hollow shaft mounted on the frame, a rock shaft within the hollow shaft, coöperating gripping jaws on the shafts, resilient means for urging the rock shaft toward the hollow shaft, a depending arm on one end of the rock shaft, a vertical pivoted lever mounted on the frame adjacent the inner end of the hollow shaft, a trip disk on the upper end of the lever, and a pivoted link on the other end of the lever for engagement with the said arm to hold the rock shaft in set position.

In testimony whereof, I affix my signature, in the presence of two witnesses.

DOUGLAS E. BLACK.

Witnesses:
EDSON M. CASE,
JOHN R. CLYMER.

Copies of this patent may be obtained for five cents each, by addressing the "Commissioner of Patents, Washington, D. C."